United States Patent
Saito

(10) Patent No.: US 7,844,830 B2
(45) Date of Patent: Nov. 30, 2010

(54) INFORMATION PROCESSING APPARATUS AND AUDIO OUTPUT METHOD

(75) Inventor: Kazuyuki Saito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1037 days.

(21) Appl. No.: 11/605,622

(22) Filed: Nov. 28, 2006

(65) Prior Publication Data

US 2007/0143602 A1 Jun. 21, 2007

(30) Foreign Application Priority Data

Nov. 28, 2005 (JP) .............................. 2005-342256

(51) Int. Cl.
*G06F 11/30* (2006.01)
*G06F 12/14* (2006.01)

(52) U.S. Cl. ...................................... 713/189
(58) Field of Classification Search .................. 713/189
See application file for complete search history.

(56) References Cited

U.S. PATENT DOCUMENTS

| 72,028 A | 12/1867 | Haase |
|---|---|---|
| 585,540 A | 6/1897 | Spangler |
| 883,186 A | 3/1908 | Fine |
| 1,914,830 A | 6/1933 | Kostohris |
| 2,027,619 A | 1/1936 | Rutherford |
| 2,079,274 A | 5/1937 | Baker |
| 2,166,031 A | 7/1939 | Wendell |
| 2,299,356 A | 2/1940 | Strohm et al. |
| 2,594,425 A | 4/1952 | Greenberg |
| 2,927,396 A | 3/1960 | Hall, Jr. |
| 3,118,017 A | 1/1964 | Wimbish |
| 3,725,580 A | 4/1973 | Thompson |
| 3,878,317 A | 4/1975 | Plaskon |
| 3,888,186 A | 6/1975 | Jentzsch et al. |
| 3,965,967 A | 6/1976 | Jentzsch et al. |
| 4,067,258 A | 1/1978 | Valeri |
| 4,101,100 A | 7/1978 | Smith et al. |
| 4,192,062 A | 3/1980 | Balde et al. |

(Continued)

FOREIGN PATENT DOCUMENTS

DE 20012041 U1 2/2001

(Continued)

OTHER PUBLICATIONS

Notification of Reasons for Rejection mailed by the Japan Patent Office on Oct. 21, 2008.

(Continued)

*Primary Examiner*—Kambiz Zand
*Assistant Examiner*—Stephen Sanders
(74) *Attorney, Agent, or Firm*—Knobbe, Martens, Olson & Bear LLP

(57) ABSTRACT

According to one embodiment, an information processing apparatus includes encrypting unit which encrypts first digital audio data by using an encryption key, decrypting unit which decrypts the encrypted first digital audio data, a first converter which converts the decrypted first digital audio data into a first analog audio signal, a second converter which converts second digital audio data into a second analog audio signal, an analog mixer which mixes the first analog audio signal and the second analog audio signal with each other, and outputting unit which outputs the mixed audio signal.

14 Claims, 4 Drawing Sheets

U.S. PATENT DOCUMENTS

| | | |
|---|---|---|
| 4,373,306 A | 2/1983 | Rech |
| 4,677,799 A | 7/1987 | Zarembo |
| 4,817,224 A | 4/1989 | Visnaw et al. |
| 4,819,910 A | 4/1989 | Johnston |
| 5,095,822 A | 3/1992 | Martin |
| 5,267,367 A | 12/1993 | Wegmann, Jr. |
| 5,446,937 A | 9/1995 | Haskins |
| 5,566,622 A | 10/1996 | Ziaylek, Jr. et al. |
| 5,777,266 A | 7/1998 | Herman et al. |
| D412,490 S | 8/1999 | Henry |
| 5,933,898 A | 8/1999 | Estes et al. |
| D415,112 S | 10/1999 | Henry |
| D415,471 S | 10/1999 | Henry |
| D418,818 S | 1/2000 | Henry |
| D429,695 S | 8/2000 | Henry |
| D436,578 S | 1/2001 | Henry |
| D437,832 S | 2/2001 | Henry |
| 6,202,565 B1 | 3/2001 | Henry |
| 6,481,036 B1 | 11/2002 | Duvall |
| 6,498,297 B2 | 12/2002 | Samhammer |
| 6,618,636 B1 | 9/2003 | Sakai et al. |
| 6,747,212 B1 | 6/2004 | Henry |
| 6,878,881 B1 | 4/2005 | Henry |
| 7,502,470 B2 * | 3/2009 | Hanko et al. ............. 380/200 |
| 2002/0038716 A1 | 4/2002 | Pineda |
| 2005/0089164 A1 * | 4/2005 | Lang et al. ............. 380/201 |

FOREIGN PATENT DOCUMENTS

| | | |
|---|---|---|
| JP | 08-046948 | 2/1996 |
| JP | 09-081166 | 3/1997 |
| JP | 11-041689 | 2/1999 |
| JP | 11-176090 | 7/1999 |
| JP | 2972579 | 8/1999 |
| JP | 2002-157867 | 5/2002 |
| JP | 2003-523694 | 8/2003 |
| JP | 2003-348684 | 12/2003 |
| JP | 2004-104569 | 4/2004 |
| JP | 2004-336178 | 11/2004 |
| JP | 2005-051547 | 2/2005 |
| JP | 2005-275926 | 10/2005 |
| JP | 2005-323182 | 11/2005 |
| WO | WO 2005/020234 A1 | 3/2005 |

OTHER PUBLICATIONS

Notice of Reasons for Rejection mailed by Japan Patent Office on Jan. 5, 2010.

* cited by examiner

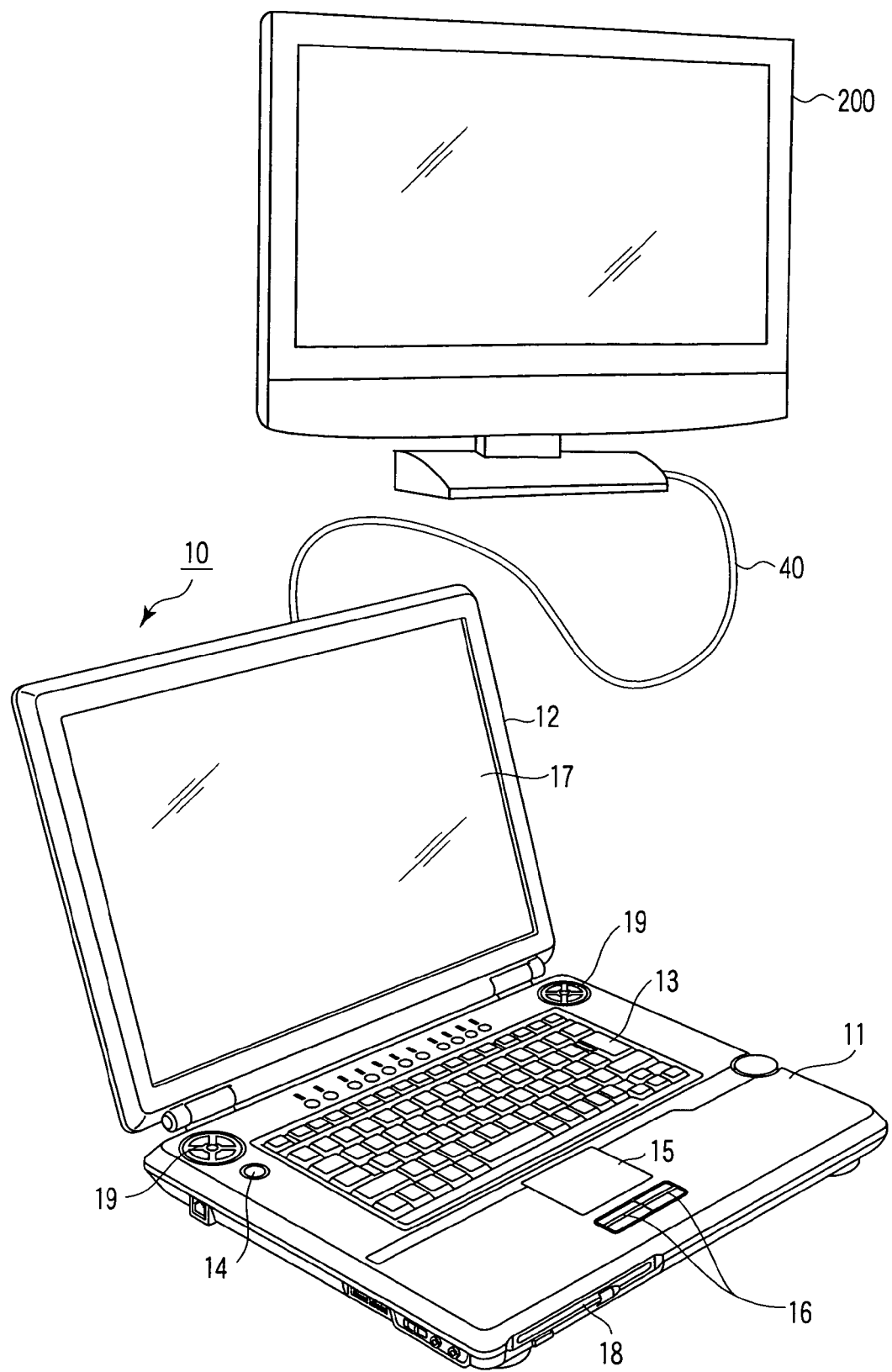
F I G. 1

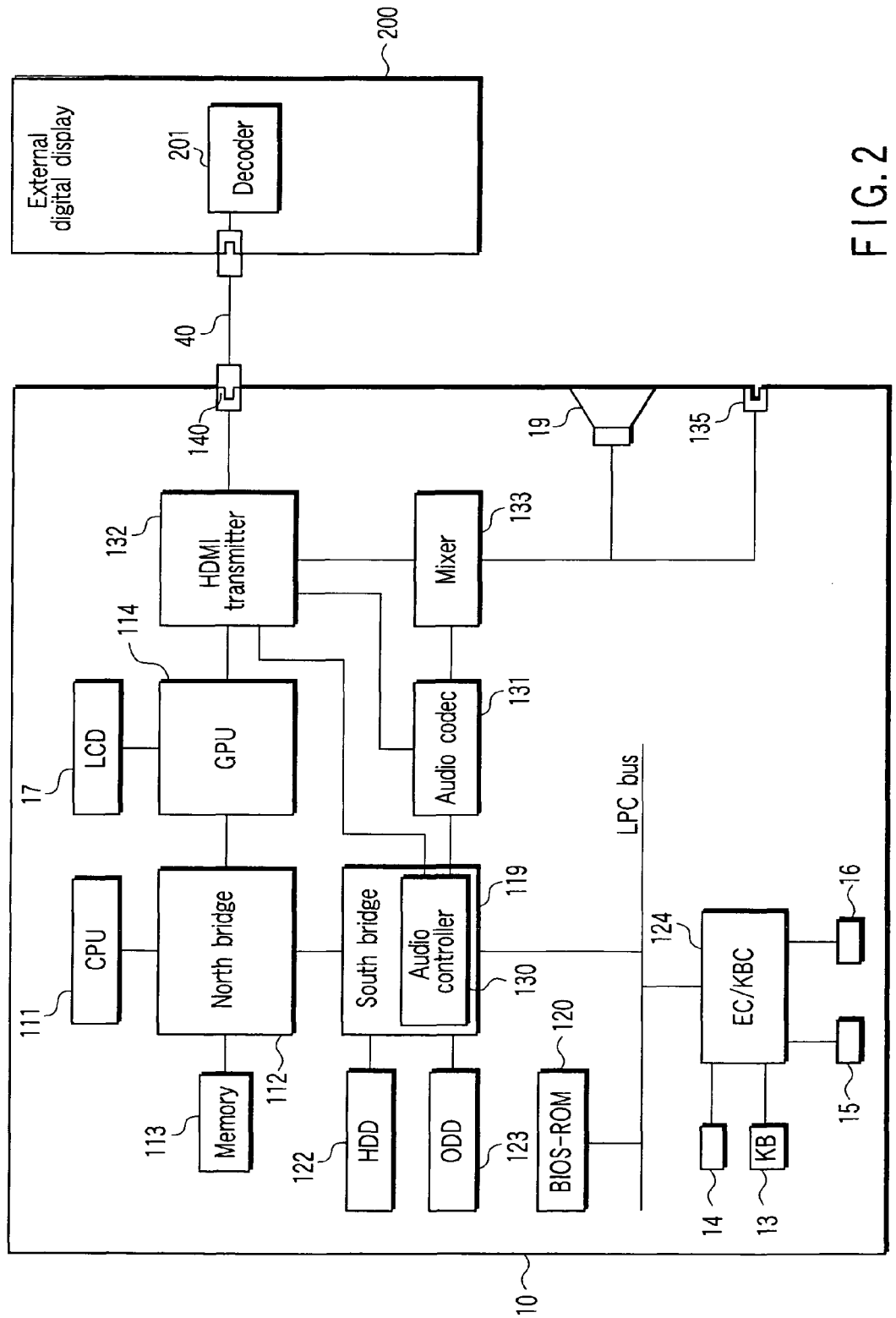
F I G. 2

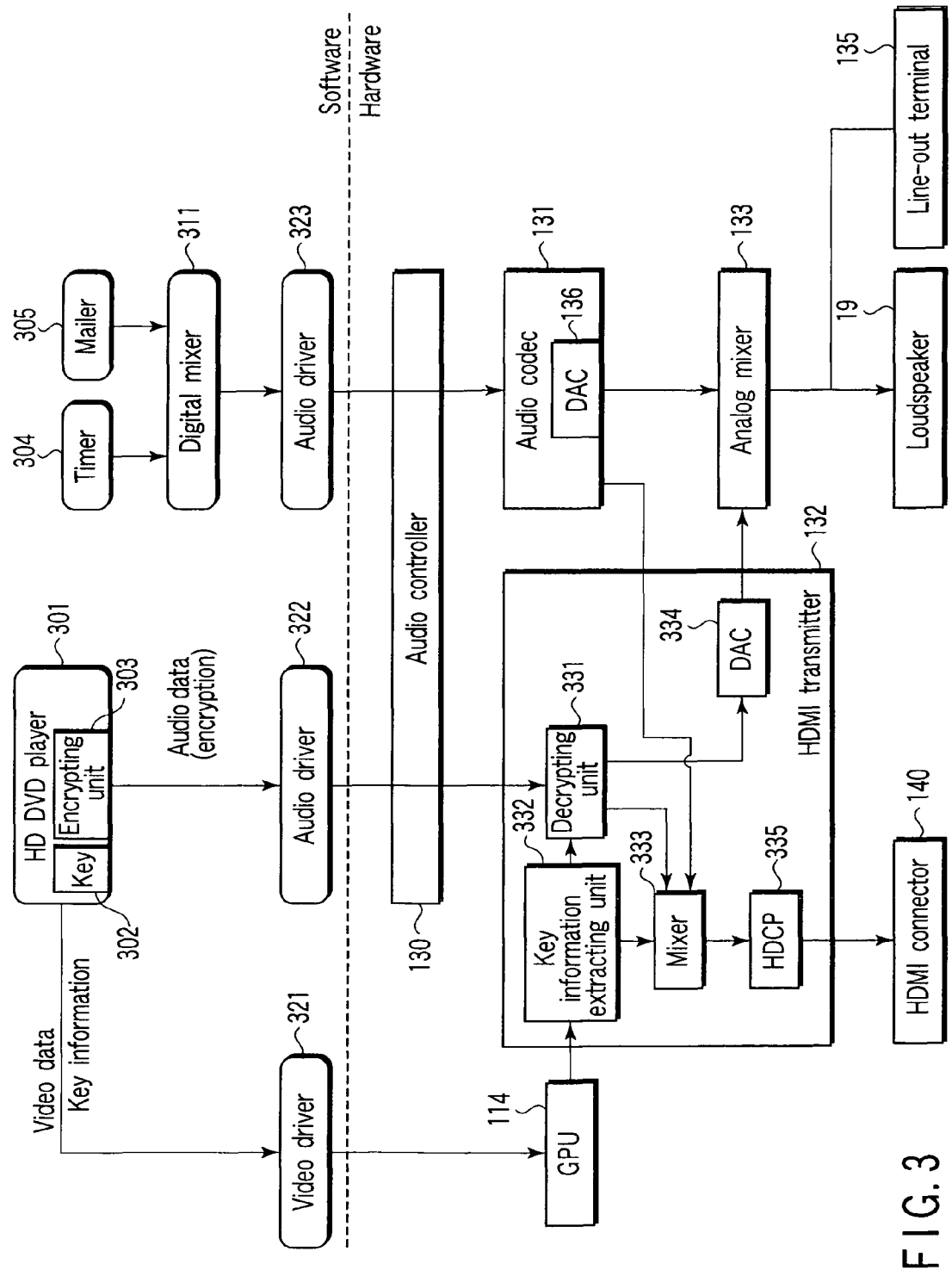
F I G. 3

INFORMATION PROCESSING APPARATUS AND AUDIO OUTPUT METHOD

CROSS-REFERENCE TO RELATED APPLICATIONS

This application is based upon and claims the benefit of priority from Japanese Patent Application No. 2005-342256, filed Nov. 28, 2005, the entire contents of which are incorporated herein by reference.

BACKGROUND

1. Field

One embodiment of the invention relates to an information processing apparatus which outputs copy-protected audio data and an audio output method.

2. Description of the Related Art

When content which is copy-protected to prevent illegal copy are reproduced by a computer, audio data must be protected to prevent raw data generated in data processing from being copied. As a protecting method, a method which encrypts audio data transacted between modules and devices is known.

For example, in Jpn. Pat. Appln. KOKAI Publication No. 2003-523694, as one encrypting method, a method of adding noise is disclosed.

However, an operating system of a computer does not assume that data is encrypted. For this reason, when encrypted audio data and other audio data are digitally mixed with each other by a conventional method, the encrypted audio data cannot be decrypted.

For this reason, an output of encrypted audio data or other audio data is exclusively selected. A computer includes audio data required to generate a beep sound. When the exclusive processing is performed, a problem in functions of the computer is posed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a perspective view showing an example of schematic configuration of a personal computer serving as an information processing apparatus according to an embodiment of the present invention;

FIG. 2 is a block diagram showing an example of a circuit configuration of a personal computer according to an embodiment of the present invention;

FIG. 3 is a block diagram showing a configuration to output copy-protected audio data.

DETAILED DESCRIPTION

Figure 4:
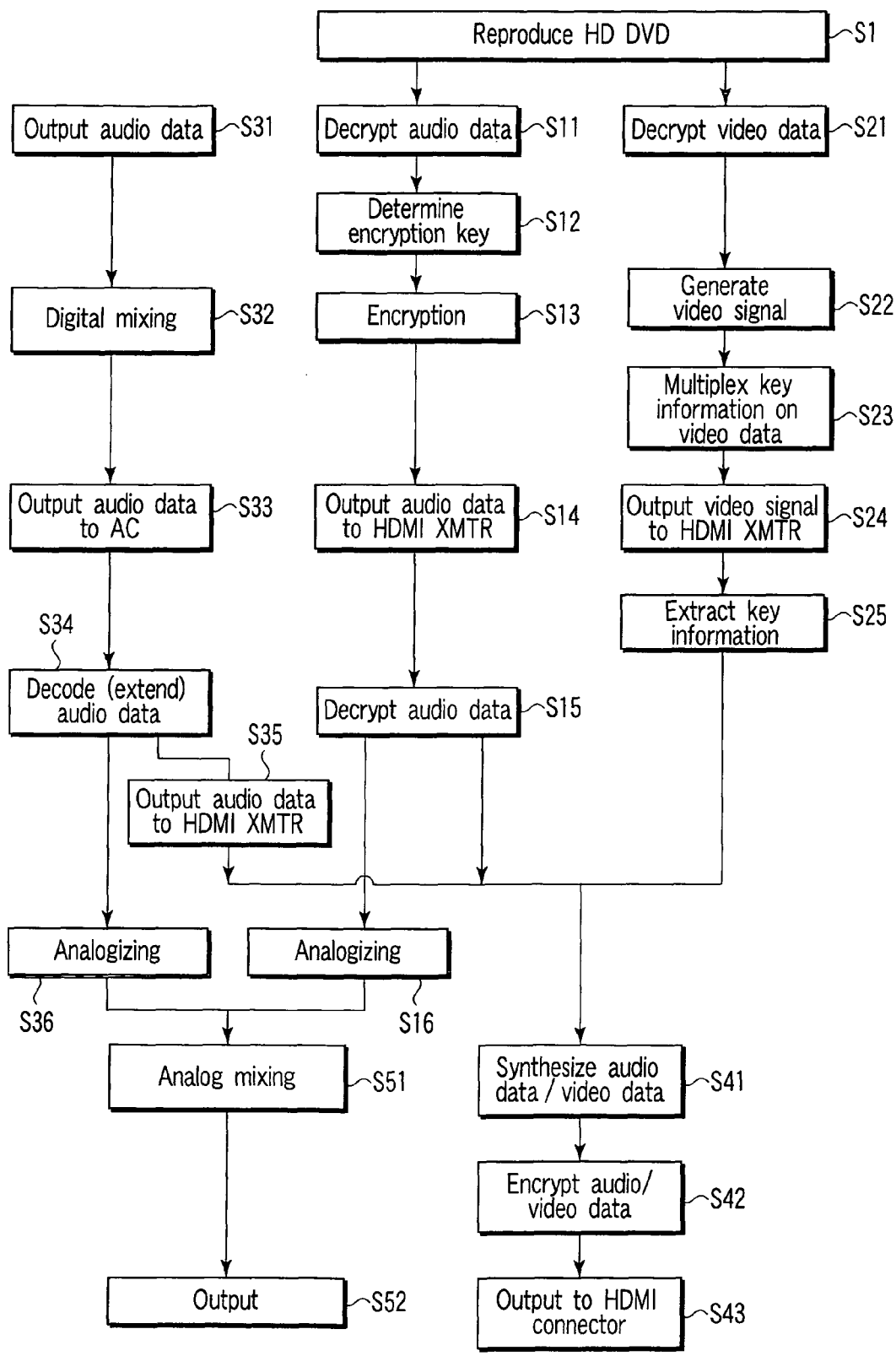
FIG. 4 is a flowchart showing a procedure of a process of outputting copy-protected audio data.

Various embodiments according to the invention will be described hereinafter with reference to the accompanying drawings. In general, according to one embodiment of the invention, An information processing apparatus comprises encrypting unit which encrypts first digital audio data by using an encryption key, decrypting unit which decrypts the encrypted first digital audio data, a first converter which converts the decrypted first digital audio data into a first analog audio signal, a second converter which converts second digital audio data into a second analog audio signal, an analog mixer which mixes the first analog audio signal and the second analog audio signal with each other, and outputting unit which outputs the mixed audio signal.

FIG. 1 is a perspective view of a notebook personal computer the display unit of which is opened and a docking station serving as an expanded unit. FIG. 2 is a perspective view of the computer from a rear surface side.

This computer 10 is constituted by a computer body 11 and a display unit 12. In the display unit 12, a display device constituted by a liquid crystal display (LCD) 17 is built. A display screen of the LCD 17 is positioned at almost the center of the display unit 12.

The display unit 12 is provided on the computer body 11 so as to be capable of rotating freely between the opened position and the closed position. The computer body 11 has a thin-box-like housing. On an upper surface of the housing, a keyboard 13, a power button 14 to turn on/off the computer 10, a touch pad 15, a touch pad control button 16, loudspeakers 19, and the like are arranged. On the front side of the computer body 11, a disk insertion slot 18 of an optical disk drive which can reproduce a high definition digital versatile disc (HD DVD) is arranged.

Video and audio signals generated by the computer body 11 and encrypted in accordance with the high-bandwidth digital content protection (HDCP) system standard are supplied to an external digital display 200 through a cable 40 connected to a connector arranged on the rear surface of the computer body 11 and being in accordance with the high-definition multimedia interface (HDMI) standard.

A system configuration constituted by the computer 10 and the external digital display 200 will be described below with reference to FIG. 2.

The computer, as shown in FIG. 2, includes a central processing unit (CPU) 111, a north bridge 112, a main memory 113, a graphics processing unit (GPU) 114, a south bridge 119, a BIOS-ROM 121, a hard disk drive (HDD) 122, an optical disk drive (ODD) 123, an embedded controller/keyboard controller (EC/KBC) IC 124, and the like.

The CPU 111 is a processor arranged to control an operation of the computer 10. The CPU 111 executes an operating system (OS) and various application programs loaded from the HDD 122 into the main memory 113.

The CPU 111 also executes a basic input output system (BIOS) program stored in the BIOS-ROM 121. The BIOS-ROM 121 is a program for hardware control.

The north bridge 112 is a bridge device which connects a local bus of the CPU 111 and the south bridge 119 to each other. In the north bridge 112, a memory controller which accesses and controls the main memory 113 is also built. The north bridge 112 also has a function of executing communication with the GPU 114 through an accelerated graphics port (AGP) bus or the like.

The GPU 114 is a display controller which controls the LCD 17 or the external digital display 200 used as a display monitor of the computer 10. The GPU 114 has a video memory (VRAM). The GPU 114 generates an image signal forming a display image to be displayed on the LCD 17 or the external digital display 200 of the display unit 12 from display data written to the video memory by the OS/application programs.

The south bridge 119 controls various devices on a low pin count (LPC) bus. In the south bridge 119, an integrated drive electronics (IDE) controller to control the hard disk drive (HDD) 122 and the optical disk drive (ODD) 123, a peripheral component interconnect (PCI) controller, a USB controller, and an audio controller 30 are built.

The optical disk drive 123 is a drive unit to drive storage media such as an HD DVD, a DVD, or a CD. The optical disk drive 123 is a drive unit which writes data to a recordable optical medium such as a CD-R or a DVD-R and which writes/erases data to/from a rewritable optical medium such as a CD-RW, a DVD-RW, or a DVD-RAM.

The audio controller 130 supplies digital audio data to at least one of an audio codec 131 and an HDMI transmitter 132 depending on types of audio drivers to be used by the applications.

The audio codec 131 supplies an audio signal obtained by decoding (extending) audio data to the loudspeakers 19 through an analog mixer 133 to cause the loudspeakers 19 to output sound. The audio signal is supplied to an external loudspeaker connected to a line-out terminal 135 to cause the external loudspeaker to output sound. The audio codec 131 has a function of coding analog audio data input from the outside.

The embedded controller/keyboard controller (EC/KBC) IC 124 is a 1-chip microcomputer in which an embedded controller for power management, the keyboard (KB) 13, the touch pad 15, and a keyboard controller to control a touch pad control button 16 are integrated. The embedded controller/keyboard controller (EC/KBC) IC 124 has a function which powers on/off the computer 10 in cooperation with a power supply controller depending on an operation of the power button 14 by a user.

The HDMI transmitter 132 synthesizes the video data and the audio data generated by the GPU 114 in accordance with a scheme determined by the HDMI and generates digital data encrypted by the HDCP scheme to supply the digital data to an HDMI connector 140. The HDMI transmitter 132 builds an audio codec therein, converts the audio data into analog data, and supplies the analog data to the analog mixer 133. The HDMI transmitter 132 is provided as one semiconductor device. A decrypting unit 331, a key information extracting unit 332, and a DAC 334 are packaged in one semiconductor device.

The analog mixer 133 synthesizes the analog audio signal supplied from the audio codec 131 and the analog audio signal supplied from the audio codec in the HDMI transmitter 132 with each other to supply the synthesized audio signal to the loudspeakers 19, the line-out terminal 135, and the like.

The external digital display 200 has a decoder 201 to decrypt a video signal encrypted by the HDMI transmitter 132.

When the computer 10 reproduces content which is copy-protected to prevent illegal copy, the computer 10 protects data to prevent raw data generated in data processing from being copied and to make it possible to make sound output from another application at the same time.

A configuration which protects audio data of copy-protected content and makes sound output from another application at the same time will be described below with reference to FIG. 3.

An HD DVD player 301, a timer 304, and a mailer 305 are applications run under on the operating system.

The HD DVD player 301 decrypts video data and audio data from reproduced data of an HD DVD obtained by the optical disk drive 123. The HD DVD player 301 has a key 302 having a plurality of encryption keys and a encrypting unit 303 which encrypts audio data by using an encryption key selected from the encryption keys included in the key 302.

The timer 304 has a function of making an alarm sound when a predetermined time has come. The mailer 305 has a function of transmitting/receiving mails and making a notification sound when a mail is received.

The digital mixer 311 is a module run under on the OS. The digital mixer 311 converts audio data received from the application/OS into data in a common format. When a plurality of audio data are simultaneously received, a plurality of audio data converted into data in a common format are mixed with each other. In Windows (trademark) available from Microsoft Corporation, a module called kmixer corresponds to the digital mixer 311.

The audio controller 130 supplies audio data to the HDMI transmitter 132 or the audio codec 131 depending on a designation from audio drivers 322 and 323.

A video driver 321 writes video data received from the application/OS to the video memory of the GPU 114 and controls the GPU 114.

The HDMI transmitter 132 generates data depending on a scheme of the HDMI from the video signal and the audio signal and encrypts the generated data in accordance with a scheme of the HDCP.

The audio codec 131 decodes (extends) compressed audio data. The decoded (extended) audio data is converted into an analog audio signal by a digital-to-analog converter (DAC; first converter) 136 to obtain a signal which can be input to the loudspeakers 19 and the line-out terminal 135.

A procedure of a process of outputting copy-protected audio data will be described below with reference to FIG. 4.

A copy-protected HD DVD is reproduced by the optical disk drive 123 to obtain reproduced data (step S1). The reproduced data is provided to the HD DVD player 301. The HD DVD player 301 decrypts video data and audio data from the reproduced data (step S11 and step S21). In this case, the decrypted video data and the decrypted audio data are compressed.

The HD DVD player 301 selects an encryption key used in encryption from a plurality of encryption keys (step S12). The encrypting unit encrypts the audio data decrypted from the reproduced data by using the selected encryption key (step S13).

The HD DVD player 301 gives the encrypted audio data to the audio driver 322. If the audio driver 322 is altered to illegally acquire audio data, the audio data encrypted by the process in step S13 is a random value which is meaningless for the third party who does not know the decrypting method.

The audio driver 322 gives the encrypted audio data to the audio controller 130 together with a designation such that the audio data is supplied to the HDMI transmitter 132. The audio controller 130 supplies the audio data supplied from the audio driver 322 to the HDMI transmitter (HDMI XMTR) 132 (step S14).

The HD DVD player 301 gives the video data and information of the encryption key to the video driver 321. The video driver 321 supplies the video data and the information of the encryption key to the GPU 114. The GPU 114 decodes (extends) the video data to generate a digital video signal which forms a display image to be displayed on the LCD 17 and the external digital display 200 (step S22). The GPU 114 multiplexes the information of the encryption key on the generated digital video signal (step S23). The generated digital video signal is supplied to the HDMI transmitter (HDMI XMTR) 132 (step S24).

The key information extracting unit 332 in the HDMI transmitter (HDMI XMTR) 132 extracts key information from the video signal (step S25). The HDMI transmitter 132 gives the extracted key information to the decrypting unit 331 and gives the digital video signal to an audio data/video data mixer 333.

The decrypting unit 331 decrypts the encrypted audio data by using the key information extracted by the process in step S25 and decodes (extends) the compressed audio data (step S15). The decrypting unit 331 gives the decoded audio data to the audio data/video data mixer 333 and the digital-to-analog converter (DAC; second converter) 334. The DAC 334 converts the digital audio data into an analog audio signal to supply the analog audio signal to the analog mixer 133 (step S16).

The timer 304 supplies compressed audio data of an alarm sound to the digital mixer 311 to make an alarm sound when a predetermined time has come (step S31). The mailer 305 supplies the compressed audio data of a notification sound to the digital mixer 311 to make a notification sound when a mail is received (step S31).

The digital mixer 311 converts audio data supplied from applications of the timer 304, the mailer 305, and the like into data in a common format to mix the converted data (step S32). The digital mixer 311 gives the mixed audio data to the audio driver 323. The audio driver 323 gives the mixed audio data to the audio controller 130 together with a designation such that the audio data is supplied to the audio codec 131. The audio controller 130 supplies the audio data supplied from the audio driver 323 to the audio codec (AC) 131 (step S33).

The audio codec 131 decodes (extends) the compressed audio data (step S34). The audio codec 131 supplies the decoded (extended) audio data to the HDMI transmitter (HDMI XMTR) 132 (step S35).

The audio data/video data mixer 333 multiplexes the audio data decoded by the process in step S15, the audio data input by the process in step S35, and the video signal obtained after a key is extracted by the process in step S25 in conformity to a scheme of the HDMI (step S41). An HDCP encryption unit 335 encrypts the synthesized signal in accordance with a scheme of the HDCP (step S42) and outputs the encrypted signal to the HDMI connector 140 (step S43).

The audio codec 131 converts the digital audio data decoded (extended) by the process in step S34 into an analog audio signal by the digital-to-analog converter (DAC; first converter) 136 (step S36). The audio codec 131 supplies the analog audio signal to the analog mixer 133.

The analog mixer 133 mixes the analog audio signal supplied from the audio codec 131 and the analog audio signal supplied from the HDMI transmitter 132 by the process in step S16 with each other (step S51). The analog mixer 133 outputs the mixed audio signal to the loudspeakers 19, the line-out terminal 135, and the like (step S52).

As described above, the encrypted data is processed in isolation from processing of audio data for an OS, and the data is converted into an analog signal and then subjected to mixing to make it possible to realize compatibility between the encryption and the mixing.

What is claimed is:

1. An information processing apparatus comprising:
    an audio data generator configured to generate the first digital audio data from copy-protected content;
    an encrypting unit configured to encrypt first digital audio data with an encryption key;
    a multiplexer configured to multiplex information of the encryption key on the digital video signal;
    an extracting unit configured to extract the information of the encryption key multiplexed on the digital video signal;
    a decrypting unit configured to decrypt the encrypted first digital audio data with the extracted information of the encryption key;
    a first converter configured to convert the decrypted first digital audio data into a first analog audio signal;
    a second converter configured to convert second digital audio data into a second analog audio signal;
    an analog mixer configured to mix the first analog audio signal and the second analog audio signal with each other; and
    an outputting unit configured to output the mixed audio signal.

2. The information processing apparatus according to claim 1, wherein the second digital audio data is data obtained by mixing a plurality of digital audio data.

3. The information processing apparatus according to claim 1, further comprising a second multiplexer configured to multiplex a digital video signal, the decrypted first digital audio data, and the second digital audio data.

4. The information processing apparatus according to claim 3, wherein the second multiplexer is configured to synthesize the digital video signal, the decrypted first digital audio data, and the second digital audio data in accordance with a scheme determined by the HDMI.

5. The information processing apparatus according to claim 4, further comprising second encrypting unit configured to encrypt the multiplexed data.

6. The information processing apparatus according to claim 4, wherein the second encrypting unit is configured to perform encryption in accordance with a scheme of the HDCP.

7. The information processing apparatus according to claim 1, further comprising:
    an optical disk drive configured to reproduce an optical disk; and
    a demodulator configured to demodulate reproduced data of the optical disk output from the optical disk drive to generate the first digital audio data.

8. An audio output method comprising:
    encrypting first digital audio data by using an encryption key;
    generating first digital audio data from data which is obtained by encrypting copy-protected content;
    multiplexing information of an encryption key on the digital video signal;
    extracting the information of the encryption key multiplexed on the digital video signal;
    decrypting the encrypted first digital audio data with the extracted information of encryption key;
    converting the decrypted first digital audio data into a first analog audio signal;
    converting second digital audio data into a second analog audio signal; and
    mixing the first analog audio signal and the second analog audio signal with each other.

9. The audio output method according to claim 8, further comprising mixing a plurality of digital audio data to generate the second digital audio data.

10. The audio output method according to claim 8, further comprising multiplexing a digital video signal, the decrypted first digital audio data, and the second digital audio data.

11. The audio output method according to claim 10, wherein the synthesis is performed in accordance with a scheme determined by the HDMI.

12. The audio output method according to claim 10, further comprising encrypting the multiplexed data.

13. The audio output method according to claim 12, wherein the multiplexed data is encrypted in accordance with a scheme of the HDCP.

14. The audio output method according to claim 8, further comprising modulating reproduced data of an optical disk output from an optical disk drive to generate the digital audio data.

* * * * *